United States Patent
Oude Luttighuis

Patent Number: 5,578,114
Date of Patent: Nov. 26, 1996

[54] BIOLOGICAL FILTER PROVIDED WITH A PELLETIZED BIOLOGICALLY ACTIVE COMPOST CARRIER MATERIAL AND METHOD FOR THE PRODUCTION OF A PELLETIZED BIOLOGICALLY ACTIVE COMPOST CARRIER MATERIAL

[75] Inventor: Hermanus H. F. Oude Luttighuis, Rhenen, Netherlands

[73] Assignee: Grontmij Advies & Techniek BV, De Bilt, Netherlands

[21] Appl. No.: 395,457

[22] Filed: Feb. 28, 1995

[30] Foreign Application Priority Data

Mar. 4, 1994 [NL] Netherlands ............... 9400328

[51] Int. Cl.$^6$ .............. B01D 46/30; B01D 53/04
[52] U.S. Cl. ............... 96/108; 96/154
[58] Field of Search ............ 71/11, 64.13; 95/90, 95/92, 107, 116, 141, 143, 210, 211, 237; 96/108, 121, 131, 154; 210/150, 188, 617

[56] References Cited

U.S. PATENT DOCUMENTS

| | | | |
|---|---|---|---|
| 3,216,905 | 11/1965 | Baptist | 95/141 X |
| 3,339,343 | 9/1967 | Van Buuren | 95/141 X |
| 4,126,433 | 11/1978 | Forssberg et al. | 96/108 X |
| 4,421,534 | 12/1983 | Walker | 55/73 |
| 4,553,986 | 11/1985 | Ciliberti et al. | 95/116 |
| 4,734,111 | 3/1988 | Hoffman | 55/269 X |
| 4,882,058 | 11/1989 | Burton | 210/150 X |
| 4,961,763 | 10/1990 | Thompson et al. | 96/131 X |
| 5,078,881 | 1/1992 | Augustine et al. | 95/90 X |
| 5,082,475 | 1/1992 | Bentz | 95/141 X |
| 5,085,766 | 2/1992 | Born | 96/154 X |
| 5,089,036 | 2/1992 | Hawes | 96/108 |
| 5,198,001 | 3/1993 | Knebel et al. | 95/141 |
| 5,232,676 | 8/1993 | Wolff et al. | 95/210 X |
| 5,240,611 | 8/1993 | Burton | 210/617 X |
| 5,407,470 | 4/1995 | Jutzi | 96/121 |
| 5,413,714 | 5/1995 | DeFilippi et al. | 95/211 X |
| 5,431,808 | 7/1995 | Zumbragel | 95/92 X |

FOREIGN PATENT DOCUMENTS

| | | | |
|---|---|---|---|
| 0413638 | 2/1991 | European Pat. Off. | |
| 0464661 | 1/1992 | European Pat. Off. | |
| 4241605 | 6/1994 | Germany | 96/154 |
| 52-071372 | 6/1977 | Japan | 95/90 |
| 61-035826 | 2/1986 | Japan | 95/92 |
| WO86/03689 | 7/1986 | WIPO | |
| WO92/19357 | 11/1992 | WIPO | |
| WO93/18800 | 9/1993 | WIPO | |

Primary Examiner—Robert Spitzer
Attorney, Agent, or Firm—Darby & Darby, P.C.

[57] ABSTRACT

The invention relates to a biological filter for the purification of waste gasses, which filter is provided with a bed of pelletized biologically active compost carrier material. The invention also relates to a method for the production of the spherical biologically active material without the use of additives. According to the invention the biologically active compost carrier material is present in the form of very stable spherical pellets. The bed of pelletized biologically active compost carrier material consists of one or more layers.

8 Claims, 3 Drawing Sheets

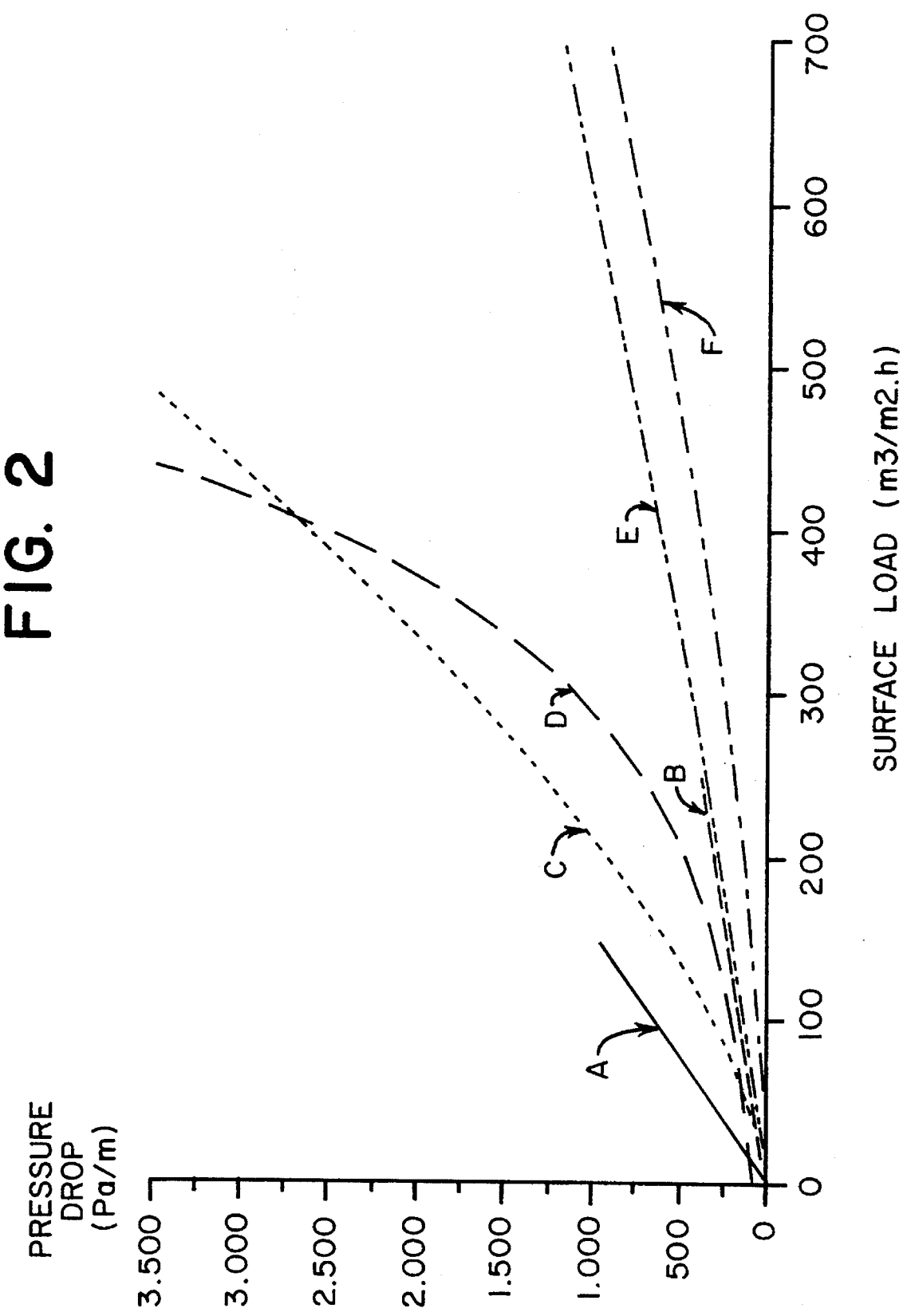

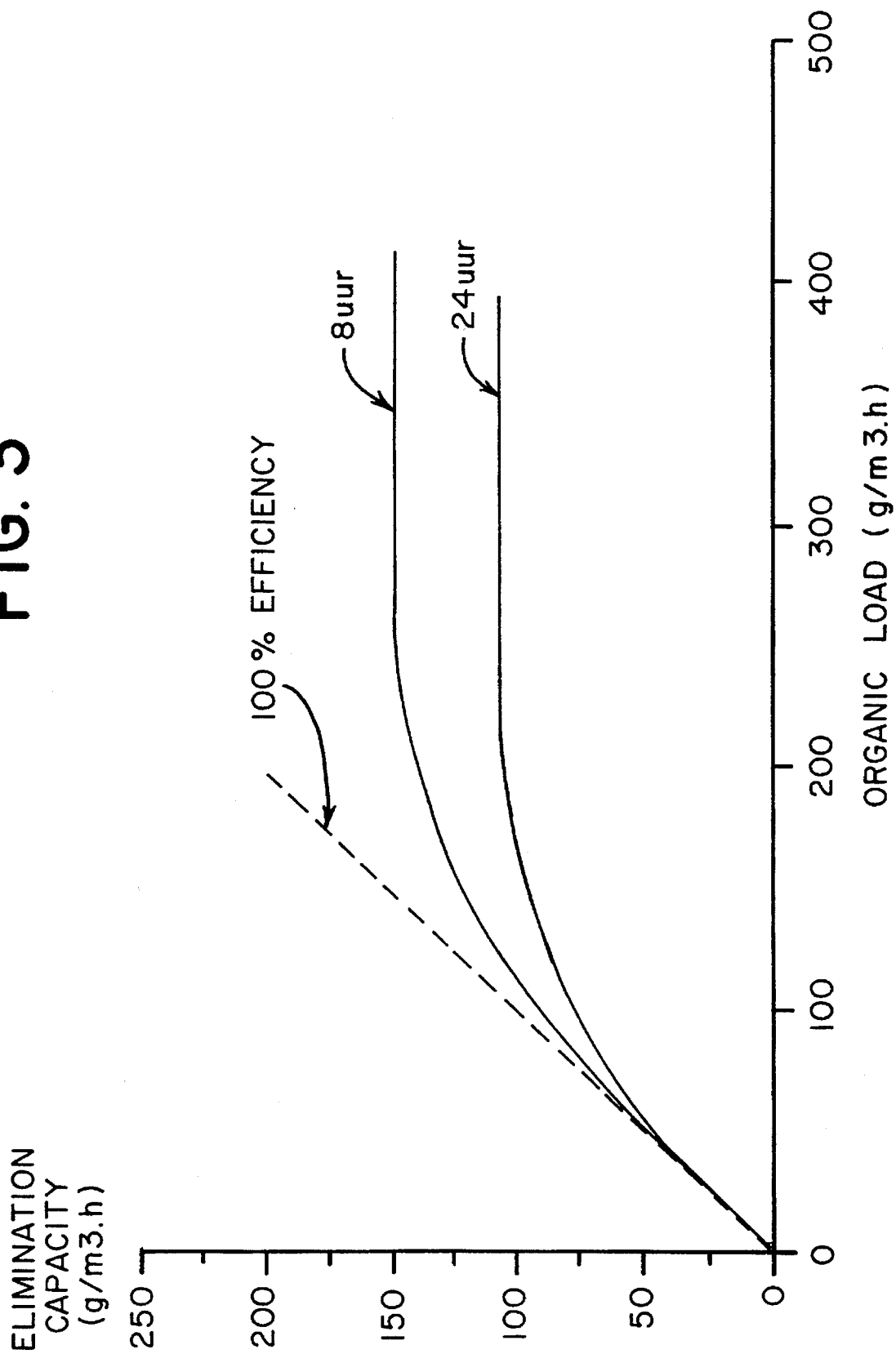

BIOLOGICAL FILTER PROVIDED WITH A PELLETIZED BIOLOGICALLY ACTIVE COMPOST CARRIER MATERIAL AND METHOD FOR THE PRODUCTION OF A PELLETIZED BIOLOGICALLY ACTIVE COMPOST CARRIER MATERIAL

BACKGROUND OF THE INVENTION

The invention relates to a biological filter for the purification of waste gasses, which filter is provided with a bed of pelletized biologically active compost carrier material, and also to a method for the preparation of the biologically active carrier material.

Such a biological filter for the purification of waste gasses is known. The working of biological filters in general is based on the removal of undesirable components from waste gasses resulting from the decomposition of these components by microorganisms. Hereby one distinguishes between three fundamentally different forms of the process: biofilters, biowashers and trickling filters. In biowashers the microorganisms are freely dispersed in a water phase containing dissolved nutrients, while in trickling filters and biofilters the microorganisms are immobilized on a carrier material arranged in a packed bed. In trickling filters water or a nutrient medium is continuously or intermittently recirculated over a packing. In biofilters there is no recirculation of water, but, in order to maintain the moisture level of the filter material, the necessary water is added from time to time by spraying the packing.

The carrier material in biofilters has three functions. In the first place the carrier material serves to give the packed bed a loose structure so that it can easily be streamed through without much energy loss. The carrier material serves further for the retention of the microorganisms, which take care of the decomposition of the undesirable components from the waste gasses. Finally the carrier material serves as water and nutrient storage for the microorganisms.

The carrier material in biological filters usually consists of particles of a size such that apart from a reasonable specific surface (surface per unit volume) also an acceptable flow resistance is guaranteed. Too small a specific surface results in the filter having a volume that is too large and too uneconomical, while if the filter resistance is too high, too much energy is used when the gas stream is lead through the filter.

The microorganisms that are responsible for the decomposition of the (mainly) organic components, are for their metabolism dependent on the various inorganic nutrients. For this reason carrier materials are used which are able to supply these nutrients (with biofilters: compost, and to a lesser degree peat, heather, tree-bark and the like) or nutrients in solution are continuously or intermittently dispersed over the carrier material (trickling filters).

As carrier materials with the highest density of microorganisms most kinds of compost are applicable. However, these materials (and also peat, heather and tree-bark) have the common disadvantage that they age very quickly. As cause for the carrier material's ageing one could name the decrease of the fibrous structure (lignin- and cellulose fibres) due to biological conversions. Apart from that, moisture loss resulting from too low a relative humidity and/or a rise in temperature in the carrier material has a very negative effect on the packing.

Lignin and cellulose constitute ligno-cellulose-complexes, giving vegetable material (such as the basis for heather, peat and also compost, the latter also consisting of animal material) firmness and flexibility. Lignin consists of a mixture of polymerized phenyl propane-like components, which, in contrast to the fibrous cellulose molecules, are strongly esterified and due to interconnection form very large, complex molecules. Lignin is rigid, giving firmness to the fibres. It is very resistant to enzymatic decomposition; only a small group of microorganisms (fungi that can produce phenyl oxidases: so-called white-rot fungi) are able to (aerobically) break down this type of molecules. Cellulose is much more easy to break down and gives fibres just flexibility. Nevertheless, in biofilters decomposition of lignin takes place also, even though it is a gradual process. The break down of cellulose and lignin fibres results in the material becoming ever finer (more crumbly).

Many kinds of compost have the tendency to form lumps which results in a strong decrease of the specific surface. Lump formation in operational biofilters may possibly be the result of shrinkage of the mycelia (thread-like manner of growth) of fungi and actinomycetes in the compost. In dry conditions the fungi have selectively the advantage over bacteria, so that more mycelium growth occurs. With further dehydration the mycelium threads shrink and cause the compost particles, in which they are anchored, to be drawn together to form a larger aggregate. When this aggregate consists of much crumbly fine material, an almost impermeable solid mass is formed (lump). Sticky/gum-like components in the compost and fungus/actinomycete mycelia help finer particles to bind into lumps.

Due to certain parts solidifying into a lump, other places in the packing develop cracks (shrinkage cracks), causing very undesirable short-circuit currents. Such phenomena are usually irreversible, which means that once a shrinkage crack and lump have developed, they will not disappear on their own account.

Ageing in the carrier material is often revealed by the occurrence of shrinkage cracks in the carrier material. As mentioned above, shrinkage cracks may also develop due to intense drying out of filter material that is not as yet old.

The rise in temperature in the carrier material is inherent to microbiological activity. This activity may, as a result of released oxidation energy, cause the temperature to rise. This implies that biologically active filters have the tendency to dry out.

It is therefore very important that the carrier material retains a sufficiently high water content. It is known that to this end the waste gas, before entering the filter bed, must have as high a relative humidity as possible (>95%) and that moreover, because of the rise in temperature in the material resulting from biological activity, additional moisturizing of the filter bed must regularly take place. The disadvantage is, that due to frequent additional moisturizing—apart from settling of the bed—migration of fine particles occurs, the initially loose structure of the compost deteriorates fast and many open and porous surfaces will silt up. The more the material crumbles, the stronger these effects become: smudging occurs on the material.

A biological filter for the purification of waste gasses, which filter is provided with a bed of pelletized biologically active compost carrier material, is known from the WO-A-92 19357. According to this document compost is pelletized into cylindrical pellets under pressure (20–200 bar) in an apparatus (for instance an extruder) together with up to 50% mineral additives, such as bentonite. The additives serve to provide the necessary firmness.

The objective of the invention is now to provide a biological filter, whose biologically active material contains only compost and can be obtained easily without additives and pressure while still having the required firmness.

SUMMARY OF THE INVENTION

The present invention provides a biological filter for the purification of waste gasses, which filter is provided with a bed of pelletized biologically active compost carrier material, characterized in that the pelletized biologically active compost material consists of compost and is present in the form of stable spherical pellets.

Surprisingly it has been shown that the pelletized compost carrier material according to the invention, which consists only of compost, is particularly suitable to be applied in biological filters for the purification of waste gasses. It has been shown that pelletized compost carrier material according to the invention which, in contrast to the material of WO-A-92 19357 does not contain any additives, possesses the firmness required for the application in biological filters for the purification of waste gasses. The spherical biologically active compost carrier material according to the invention is also extremely stable under damp conditions.

The pellets usually have a diameter of between 1 and 30 mm. It has been shown to be advantageous if the diameter of the pellets in the bed increases in the downstream direction.

The biofilter according to the invention comprises one or more layers, whilst particularly good results are obtained when the bed is composed of three layers. The thickness of the top layer is 450–550 mm, that of the intermediate layer 450–550 mm and that of the bottom layer 20–60 mm. This distribution of the pelletized carrier material is done by means of fractionized sieving. Such distribution of the pelletized carrier material into layers guarantees a more or less homogenous structure with the result that the waste gas is very evenly distributed over the packing, preventing to a great extent such effects as preferred flow (long residence times) and at the same time lowering the flow resistance considerably. For instance the flow resistance at a surface load of 200 and 600 $m^3/m^2$.hour is about 130 and 620 Pascal/m respectively.

The slight pressure drop and the stability of the material offer the possibility to produce higher beds than has often been the case up to now (about 1 m).

Further, the invention relates to a method of manufacturing the pelletized biologically active material from compost, characterized in that the compost is pelletized with water, using a usual pelletizing bowl, without additives and without the application of pressure, whereafter the biologically active spherical pellets are dried and sieved in a number of fractions of the desired diameter. Pelletizing according to the invention takes place within 5 to 15 minutes.

It is surprising that, without additives and without the application of pressure, with the aid of a simple pelletizing bowl, extremely stable spherical compost pellets are obtained. The spherical compost pellets obtained are very advantageous both with regard to the pressure drop and biological activity and with regard to the stability (also under damp conditions) of a packing with these pellets.

It is observed that EP-A-0 413 638 describes a method of pelletizing a mixture of sphagnum and black peat using a pelletizing bowl, whereby black peat serves as binding agent. Herein one departs from two components of which the fragmentated organic material has a moisture content of less than 70% and the other component, to wit black peat, has a moisture content of between 85 and 95%. Lime is added in order to neutralize the low pH of peat. Also nitrogen (ureum), phosphorus and possibly potassium must be added in order to subsequently somewhat improve the biological activity of the material. Hereby pelletizing times of 75 to 373 minutes are needed for a mixture of sphagnum and black peat and about 10 minutes for pellets made of black peat and sawdust.

It is observed that compost and peat are different kinds of materials with consequently different properties. Peat is formed anaerobically and consists of more or less decomposed residues of plant materials. Therefore it contains a relatively small amount of nutrients of its own for the microorganisms. The pH of peat is around 4. The capacity of peat to absorb water is of all natural raw materials the greatest (moisture contents up to 80–85%).

Compost, in contrast, is mainly formed aerobically, whereby a thermophilic phase occurs. Compost is rich in nutrients and has a neutral pH, so that it has high microbial activity and a considerable buffer ability. Compost has much less capacity to absorb water. Compost is of animal (such as manure with colloidal slimy substances which are important for pelletizing) and vegetable origin.

It is clear from the above that compost is much better suited as carrier material in biofilters and needs to undergo less treatment. Thus according to the invention the use of compost yields, by means of a simple method, no additives, no mixtures, and shorter pelletizing times compared with the aforementioned prior art, a better, that is to say a biologically more active or more stable type of packing material for biofilters.

Further, WO-A-93 18800 describes biofilters for the treatment of polluted air. A large number of carrier materials is mentioned among which, as an aside, pelletized compost. There is no indication of whether and how pelletizing of compost can give stable pellets. Not a word is mentioned about particle size and distribution of the compost pellets in the biofilter. Apart from that, mention is made of the application of biofilters with a recirculating liquid medium, which is called a trickling filter (a completely different type of filter than the one according to the invention). There is clearly an excess of biomass accumulation resulting from the constant addition of nutrients to the biofilm, which is a frequently occurring disadvantage with trickling filters.

NL-A-81.04987 describes a biological filter for the purification of gasses, whereby relatively large inactive particles of the starting compost are added to fine active compost, whereby the primary purpose is to limit the pressure drop over the filter and as a result to reduce energy consumption. This does not prevent the structure decrease, but the coarse textures make that the consequences do not occur so soon. An additional problem with this kind of filter material is that eventually separation of the fine and coarse fractions occurs (as a result of migration of fine particles due to, for example, additional moistening), which has an adverse effect on both the circulation and the activity of the bed.

In EP-0 142 872 it is claimed that by adding certain (usually inert) additives to the carrier material (compost) the very adverse symptoms of ageing may be prevented and also the flow resistance is reduced. Actually, for this kind of filter material the danger of separation also exists, this time for reasons of density differences between the light additive and the relative heavy carrier (compost).

Apart from that, the claim that aging is prevented is incorrect, as the addition of, for example, little polystyrene balls, has no effect on the deterioration of the structure of the organic carrier material (compost). The addition of polystyrene balls proffers merely a moderate improvement with regard to the effects occurring through aging processes.

EP-0 497 214 describes a biologically active filter consisting of granular material having a hydrophillic porous nucleus with microorganisms and a hydrophobic coating (active charcoal as absorption layer) mixed with compost or turf (nutrient store).

BRIEF DESCRIPTION OF THE DRAWINGS

Further features of the present invention will become more readily apparent from the following detailed description of the invention taken in conjunction with the accompanying drawings, in which:

FIG. 2 is a graph illustrating the pressure drop of ethyl acetate as a function of surface load; and FIG. 3 is a graph illustrating the elimination capacity of ethyl acetate.

DETAILED DESCRIPTION

Figure 1:
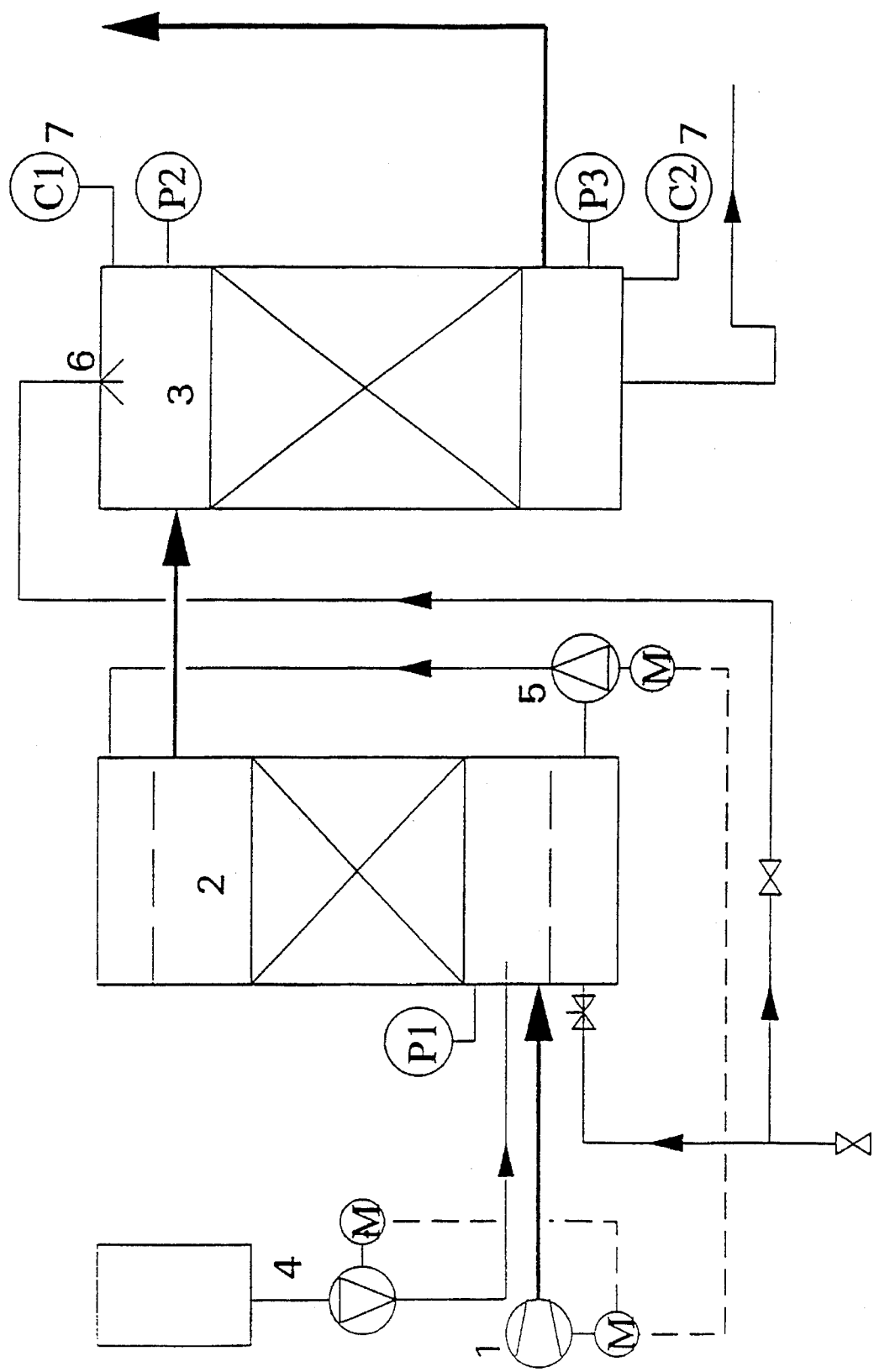
FIG. 1 illustrates a block diagram of a pilot arrangement utilized in the implementation of the biological filter of the present invention.

The invention will now be further elucidated with the aid of the Examples below, which do not limit the invention in any way. In these Examples the biological filter according to the invention is used, whereby the biologically active carrier material is present in the form of pellets. The biofilter comprises three layers, the top layer of which is about 500 mm thick consisting of pellets of about 1–6 mm. The intermediate layer is also about 500 mm thick and consists of pellets having a diameter of about 3–9 mm, while the bottom layer is about 40 mm thick and is composed of pellets having a diameter of 10–30 mm.

EXAMPLE 1

In this Example a pilot arrangement is used according to FIG. 1 whereby the waste gas used was air with an artificially supplied amount of ethyl acetate. 1 in FIG. 1 represents a ventilator and 4 the ethyl acetate dose-measuring unit. The air and ethyl acetate were led into a humidifier 2 and from there to the biofilter 3 according to the invention. A pressure transmitter P1 is connected to humidifier 2 and pressure transmitters P2 and P3 are connected to biofilter 3. Biofilter 3 is also connected to concentration measurement sampling points C1 and C2. Recirculation pump 5 takes care of the recirculation of the liquid in the humidifier. A motor M is respectively coupled to ventilator 1, the ethyl acetate dose-measuring unit 4 and the recirculation pump 5. The arrows indicate the flow direction of the air and ethyl acetate mixture. The Figure shows that the mixture of air and ethyl acetate in the biofilter is led from top to bottom, whereby the mixture, after having run through the biofilter, is drained from the bottom. In the top of the biofilter 3 an additional moisturi-zing system 6 is provided. The mixture of air and ethyl acetate was analyzed by means of gas chromatography 7 both before and after the run through the biofilter. In a life test the pilot installation was kept continuously in operation and loaded under different conditions with ethyl acetate. The loading with ethyl acetate was carried out in regimens of 8 and 24 hours a day. The material was examined at different surface loads, while the pressure drop over a packing height of about 1 m was measured by means of a U-pipe manometer. The pressure drop measured was very low and practically stable, which can be seen in FIG. 2. The surface loads varied from 100 to 600 $m^3/m^2.h$.

In FIG. 2 the pressure drop is shown as function of the surface load ($m^3/m^2.h$) for a number of different filter materials applied, to wit A) compost of household wastes B) tree-bark compost (coarse)

C) compost/sintered clay granules (60:40)

D) compost of household wastes with wood chippings

E) compost/polystyrene (50:50)

F) the filter material according to the invention.

FIG. 2 shows clearly that at greater surface loads (>200 $m^3/m^2.h$) most of the filter materials produce rather considerable pressure drops.

FIG. 3 shows the elimination capacity of ethyl acetate at a dosage during 24 hours and 8 hours a day.

FIG. 3 shows that the maximum elimination capacity (after 4 months) at 8-hour operation times amounts to about 150 $g/m^3.h$, while at continuous operation this amounts to about 110 $g/m^3.h$.

Surprisingly it has been shown, that aging does not occur in the material according to the invention. This is because the structure of the packing does not depend on the lignin and cellulose fibres, as the material has been provided with an artificial structure, the pellet form. The pellets are characterized by an active biofilm at the outside, so that the diffusion of oxygen into the pellets is limited to the outer area. One can therefore hardly speak of aerobic conditions in the pellet, so that the lignin structure here remains intact. On the outside of the pellet the white-rot fungi hardly have the opportunity to multiply because of the availability of relatively easily decomposable compounds, whereby other organisms have the advantage; this applies the more if the moisture content also stays at the required level. Shrinkage cracks practically do not occur as long as the material is kept sufficiently moist. Migration of particles due to additional moistening does not or hardly occur.

The water buffering capacity of the pelletized material is great, seeing as the pellet is hydrophillic and posses a high internal porosity. This may result in a certain control of the moisture content in the carrier material, as the biological activity mainly takes place at the outside of the pellet, so that at the onset of dehydration there is still a supply possible from the inside of the pellet, due to capillary action. This is a very important aspect with regard to maintaining the biological activity.

EXAMPLE II

The production of the filter material according to the invention was carried out with the aid of no other additive but water (i.e. without binding agent, without neutralizing substances and without nutrients) using a pelletizing bowl. The pellets formed were subsequently dried in the air and sieved in a number of fractions of the desired diameter, so that the material to be used for the composition of a packing would be as homogenous as possible. After installation of the packing the pellets can be moisturized until they contain water up to 50% by weight.

For the composition of the packing a layered construction is possible whereby relatively large pellets were applied at the bottom and smaller (more active) pellets above. This resulted in the following composition (downstream flow).

At the bottom, first a layer of 30 to 50 mm of relatively large pellets was applied, varying in size from 10 to 30 mm.

On this foundation a layer of about 500 mm thickness of pellets measuring about 3–9 mm was applied.

Finally, a layer of about 500 mm thickness of pellets measuring about 1–6 mm was applied, which layer constituted the top layer of the biofilter.

An important difference with respect to unpelletized carrier materials is that here in the horizontal plane the variance of the particle size is considerably reduced, allowing the waste gas to disperse evenly over the bed surface. Separation will not occur either, because the different particle sizes are not distributed throughout the packing, but are sorted per size into horizontal layers, and also because there are no differences in density.

I claim:

1. A biological filter for the purification of waste gases, comprising a bed of pelletized biologically active compost carrier material consisting of compost, in the form of stable spherical pellets.

2. A biological filter according to claim 1, wherein the diameter of the spherical pellets ranges from between 1 and 30 mm.

3. A biological filter according to claim 1, wherein the diameter of the spherical pellets in the bed increases in the direction of the flow of said waste gases through said filter.

4. A biological filter according to claim 1, wherein the bed consists of one or more layers.

5. A biological filter according to claim 4, wherein the bed is composed of three layers.

6. A biological filter according to claim 5, wherein the thickness of the top layer is 450–550 mm, the thickness of the intermediate layer is 450–550 mm and the thickness of the bottom layer is 20–60 mm.

7. A biological filter according to claim 6, wherein the diameter of the pellets in the top layer is 1–6 mm, the diameter of the pellets in the intermediate layer is 3–9 mm and the diameter of the pellets in the bottom layer is 10–30 mm.

8. A method for the production of pelletized biologically active material comprising:

(a) pelletizing compost with water, without the use of additives or the application of pressure, to obtain stable biologically active spherical pellets;

(b) air drying the spherical pellets; and (c) sieving the spherical pellets in a number of fractions to obtain pellets of a determined diameter.

* * * * *